Dec. 19, 1944.    H. T. KRAFT    2,365,279
PNEUMATIC TRACK
Filed Jan. 22, 1943    2 Sheets-Sheet 1

INVENTOR
Herman T. Kraft
BY
Evans + McCoy
ATTORNEYS

Dec. 19, 1944.   H. T. KRAFT   2,365,279
PNEUMATIC TRACK
Filed Jan. 22, 1943   2 Sheets-Sheet 2
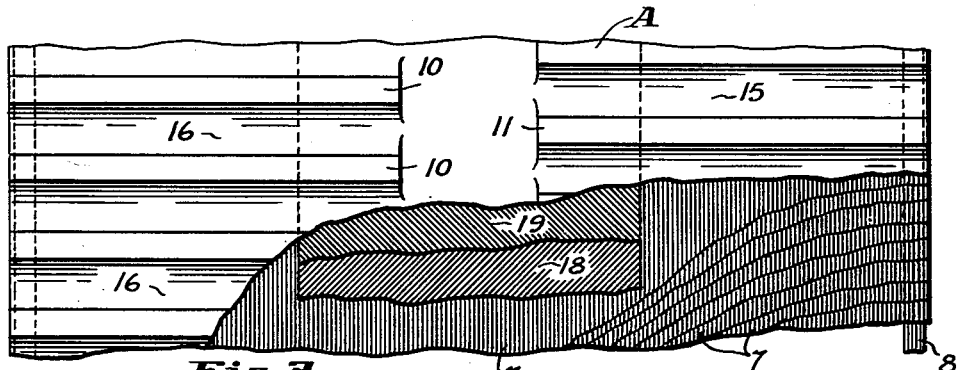
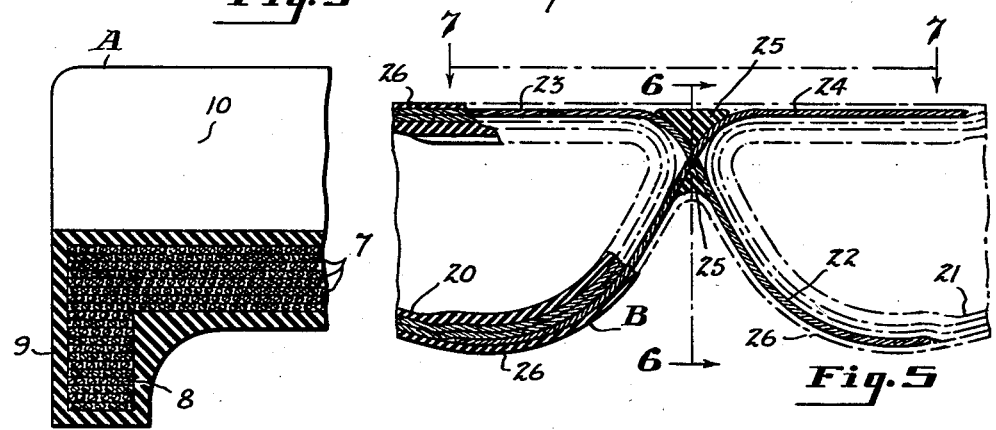
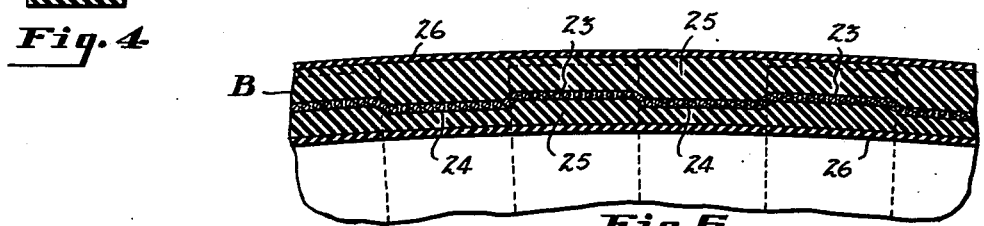
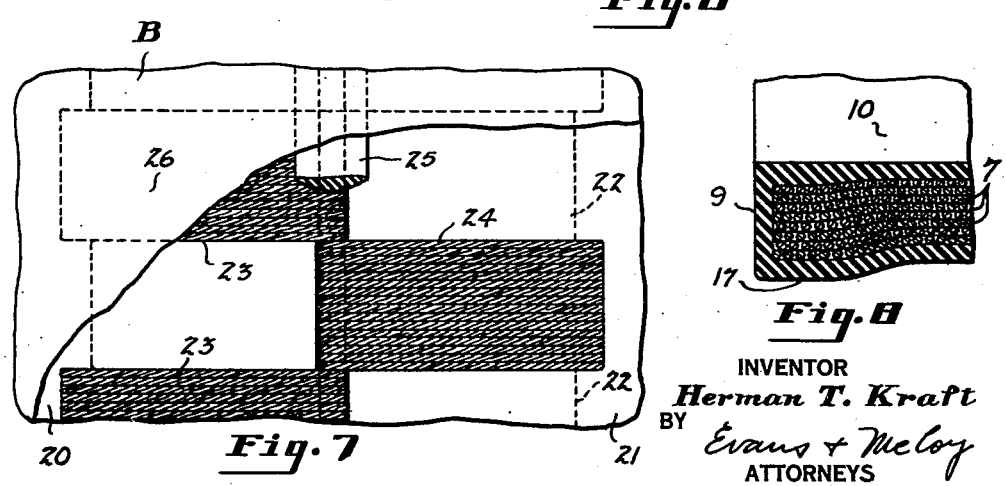
INVENTOR
*Herman T. Kraft*
BY *Evans & McCoy*
ATTORNEYS Patented Dec. 19, 1944

2,365,279

UNITED STATES PATENT OFFICE 2,365,279

PNEUMATIC TRACK

Herman T. Kraft, Akron, Ohio, assignor to The General Tire & Rubber Company, Akron, Ohio, a corporation of Ohio Application January 22, 1943, Serial No. 473,218

18 Claims. (Cl. 152—175)

This invention relates to traction devices for wheeled vehicles and has particular reference to removable tracks to be applied to vehicle wheels having resilient tires or the like.

One of the problems involved in providing tracks for use on vehicle wheels having resilient tires is the reduction or elimination of relative movement between contacting parts of the auxiliary or removable track and the resilient tire or tires to which the track is secured. Sliding or rubbing of the removable tracks on the resilient tires causes excessive wear and heating, resulting in deterioration of the rubber of either the track or the tire, or both. It is, therefore, one of the objects of the invention to provide an improved track or track device for mounting on the resilient tire or tires of a vehicle wheel which is so designed and arranged that slipping or rubbing between the parts is substantially eliminated, thereby increasing the life and efficiency of both the track and the resilient tire.

Another problem is to provide a track structure which will retain itself securely in place on the tire or tires mounting the track. Auxiliary tracks that employ inflatable means for holding them in position on the vehicle wheels have a tendency to "roll" axially or laterally off the supporting wheels on which they are mounted. It is, therefore, another object of the invention to provide an improved track of the pneumatic or inflatable type which is so constructed and arranged that rolling or lateral movement is reduced to a minimum and there is little or no tendency of the track to roll or creep axially over the supporting tire or tires.

Another object is to provide a removable track of the pneumatic type in which a relatively heavy cleated traction band is employed in combination with a relatively light inflatable annulus. Among the advantages attendant upon this arrangement is the fact that should one part become worn or damaged, the other part of the track can be maintained in service by merely replacing the worn or damaged element. Also of advantage is the provision of a unique combination of circumferential reinforcement in the traction band with lateral or radial reinforcement in the inflatable annulus.

Another and more specific object of the invention is to provide a track having a cleated rubber body or traction body and reinforced by cords that are disposed generally in parallel relation to one another and that extend primarily circumferentially around the band, there being only a minimum number of cords that extend transversely or in a lateral direction across the width of the band. As a related object the invention aims to provide an inflatable annulus for use between the traction band and a resilient vehicle tire (or tires) in which embedded cords are used for reinforcement, the cords extending primarily laterally and radially around the annulus rather than circumferentially about the annulus. More specifically, the invention is concerned with the provision of a pneumatic track in which cords are employed for reinforcement, the reinforcement of the outer or traction band being primarily in a circumferential direction while the reinforcement of the inflatable annulus that holds the traction band on the vehicle wheel is primarily in axial and radial directions.

Another object of the invention is to provide a generally improved pneumatic track structure which is simple in design and construction and relatively inexpensive to manufacture. Other objects and advantages having to do with various combinations and arrangements of parts will become apparent from the following detailed description of the invention wherein:

Fig. 3 is a fragmentary plan view of the outer or traction band of the device, the material of the band being broken away in layers to show the construction thereof;

Fig. 4 is a fragmentary radial section through one edge of the traction band to show one construction of the bead;

Fig. 5 is a radial sectional view through the central portion of the inflatable annulus showing the construction thereof and the manner in which the separate inflatable tubes are connected together;

Fig. 6 is a sectional detail taken substantially on the line 6—6 of Fig. 5;

Fig. 7 is a fragmentary plan view showing the manner of connecting the separate tubes of the inflatable annulus. This view is taken substantially along the line indicated at 7—7 of Fig. 5; and Fig. 8 is a radial sectional detail view showing a modified construction for the edge of the traction band and corresponding to the structure shown in Fig. 4.

The pneumatic track of the present invention is intended particularly for use with the so-called "dual" wheels commonly employed on trucks and other heavy land vehicles. Obviously, however, the principles of the present invention are applicable to track devices to be used on wheels having but a single tire, and to rigid wheel surfaces having no tire. The dual wheels now in common use are of the type in which a pair of pneumatic tires are mounted in spaced side by side relation on a single wheel structure to provide wider support and greater traction for the vehicle. Although wheels of the dual type having more than two tires are not in common use, it is clear that traction devices incorporating the principles of the present invention can be readily designed for use on wheels having any number of resilient or pneumatic tires. The invention will be found to lie in the particular combinations and arrangements of parts as will appear herein, the description referring to the structure by numerals of reference which indicate like parts through the several views.

The dual wheel on which the track device is mounted includes a central or supporting portion 1 that is attached to the axle of the vehicle by any well known means. On the supporting portion 1 are a pair of rim structures 2 and 3 which carry resilient rubber tires 4 and 5 that may be of the inflatable or pneumatic type. The dual wheel assembly is so constructed that the tires 4 and 5 are normally spaced apart, providing a clearance 6.

Figure 2:
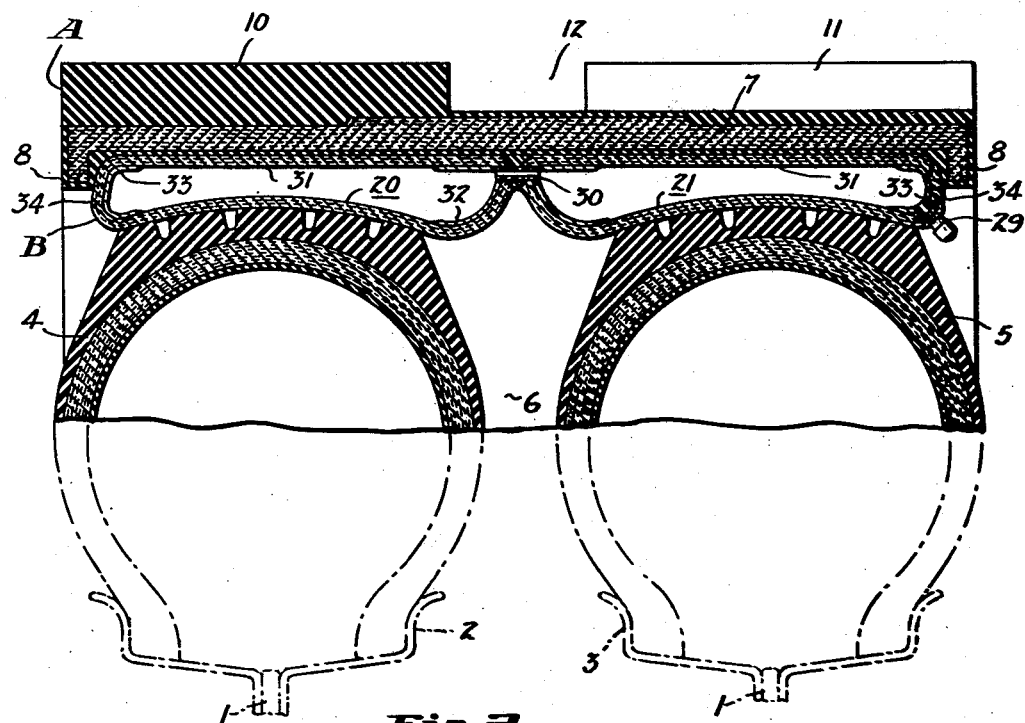
Fig. 2 is a radial sectional view, somewhat diagrammatic with respect to the wheel structure, taken substantially on the line indicated at 2—2 of Fig. 1 and enlarged with respect to that figure.

The traction device comprises an outer or traction band A and an inner or inflatable annulus B. The band A is formed of resilient and deformable composition material such as rubber, having approximately the same physical characteristics as the rubber used in conventional pneumatic vehicle tries. This band is relatively wide and flat and of circular form so as to completely embrace the tires 4 and 5 when mounted on the vehicle wheel. As shown in Fig. 2, the traction band A is of sufficient width to extend across at least the major part of the road engaging tread portion of each of the vehicle tires, and preferably is of sufficient width to completely cover the road engaging tread portions of all of the wheel tires.

Figure 1:
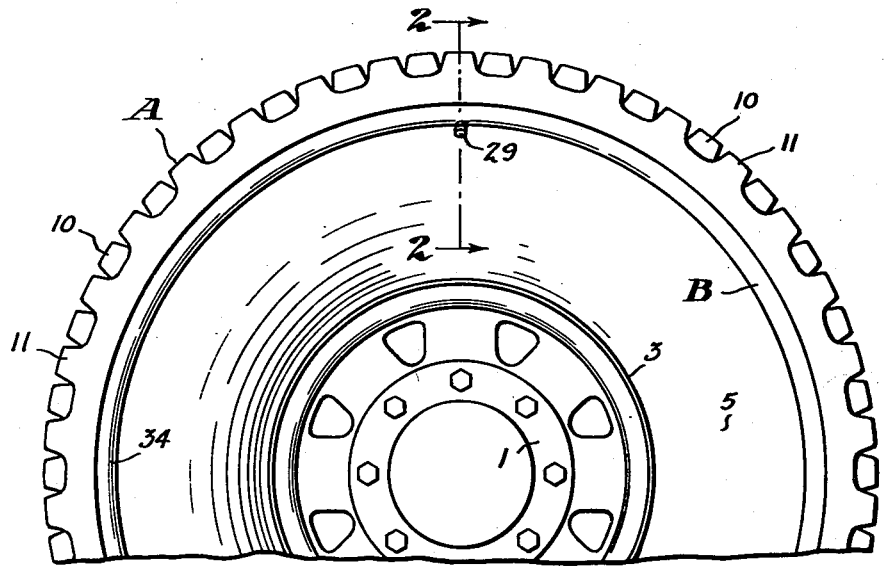
Figure 1 is a fragmentary elevational view of a pneumatic track embodying the principles of the present invention mounted on a conventional "dual" wheel structure.

Embedded in the traction band are a plurality of reinforcing cords 7 which extend circumferentially about the band, preferably completely around the entire periphery thereof. At the marginal edges of the traction band are a number of circumferential reinforcing cords 8 which are disposed radially inward of the cords 7 to form marginal beads on the band. As shown in Fig. 4, the cords 7 and 8 are surrounded by a sheath or covering of rubber, indicated at 9, which protects the cords from wear and exposure. Integral with the sheath rubber 9, and with the rubber in which the cords are embedded, constituting the body of the track, are a plurality of axially disposed, radially extending traction lugs or cleats. These cleats may be arranged according to any conventional tire tread pattern, but it has been found particularly advantageous to arrange them in a plurality of circumferentially extending rows. For example, one row consisting of cleats 10 is arranged adjacent the left hand margin of the band A, as viewed in Fig. 2, so as to overlie the tire 4, while another row of cleats, indicated at 11, is disposed adjacent the right hand margin of the tire, as viewed in Fig. 2, so as to overlie the tire 5. The inner or adjacent ends of the cleats 10 and 11 are axially spaced from one another to provide a central clearance 12 which is continuous around the entire circumference of the traction band and is coplanar with the clearance 6 between the tires 4 and 5. The cleats 10 and 11 are also arranged in circumferentially staggered relation to one another (Figs. 1 and 3). In this manner the cleats 10 are axially aligned with spaces 15 separating the cleats 11, while the cleats 11 are axially aligned with spaces 16 separating the cleats 10. It is a particular feature of the traction band A that the cleats 10 and 11 are so arranged that the device can be mounted on a wheel in either direction, the traction or gripping properties being the same regardless of the direction in which the device is rotated. Thus is eliminated the necessity for particular care in mounting the traction devices on the wheels of a vehicle to insure a certain direction of rotation.

The traction band A may be made in any suitable manner, one method being to build it up on a "flat" cylindrical drum, the drum being provided at its edges with circumferential depressions or reduced diameter portions to receive the cords 8 that constitute the beads of the band. According to this "flat band" method of building the traction band, one or more layers of uncured rubber are first applied to the band and over the shoulders thereof, after which the cords 8 are wound about the depressed shoulders of the drum. The cords 8 may be applied in the form of a continuous web or ribbon of rubber having the cords embedded therein, such cord ply material being well known in the tire building art. After the cords 8 have been applied to the shoulders of the drum, cords 7 may be wrapped about the drum across substantially the entire width of the traction band being built. For example, the cords 7 may be applied in separate plies or in a continuous wide band of rubber in which the cords are embedded. All of the cords 7 and 8 are circumferential, it being an important feature of the present invention that the reinforcing cords in the traction band are primarily circumferential in character. These cords restrict circumferential stretching or elongation of the traction band to retain the same in flat band shape and to limit the "growth" of the device. To insure adequate circumferential reinforcement of the traction band a relatively large number of the plies or layers of the cords 7 is used. For example, it has been found preferable to use at least eight plies of cords as shown in the drawings, although a larger or smaller number can be used. The bead forming cords 8 are also built up into a multiplicity of plies, twelve plies or layers of such cords being illustrated in Fig. 4. However, the exact number of bead plies 8 that are used is not critical and in fact the bead plies may be entirely omitted as in the modification shown in Fig. 8, wherein beads are provided by a thickening of the rubber indicated at 17.

After the cords 7 and 8 have been placed about the end margins and about the circumference of the band they are covered with one or more layers of uncured rubber to enclose and protect the cords and which unites with the rubber of the cord ply material to constitute the body of the track. The rubber to form the cleats 10 and 11 may be applied around the outer periphery of the band in a layer of uniform thickness to be shaped during curing, or the rubber may be applied in the form of separate blocks approximating the size and shape of the cleats 10 and 11. After the track has been completely assembled it is placed in a suitable mold and cured by heat in accordance with well known vulcanizing practice. In the case of the embodiment shown in Fig. 8, radial outward or expanding pressure is applied to the traction band during the curing thereof over an area extending circumferentially about the band and across the width of the band but discontinuous over area extending inwardly from the edges of the band corresponding to the widths of the desired beads. This pressure may be applied by means such as an air bag inflated under pressure and results in stretching the central circumferential cords while the marginal circumferential cords remain unstretched or substantially so and the margins of the band assume the beaded form shown. Artificial "growth" is thus imparted to the device during the curing process so that the "growth" during use is minimized.

Around the outermost layers or plies of the circumferential cords 7 is placed a relatively small number of layers or plies of narrow bias cut reinforcing cord material indicated by the layers or plies 18 and 19. The diagonal cords of the ply 18 run in a direction opposite to that of the cords of the ply 19. These diagonal or bias cut plies 18 and 19 are of materially less width than the width of the traction band but are centrally disposed and extend entirely across the open space 12 between the inner ends of the cleats 10 and 11. The margins of the bias ply material 18 and 19 extend a short distance under the inner ends of the cleats (such as about ⅓ the length of the cleats) and serve to tie the cleats 10 to the cleats 11 to resist axial separation between the different circumferential rows of cleats. Since the individual cords in the plies 18 and 19 are of relatively short length, they have a minimum reinforcing effect circumferentially of the track, and since they do not extend between the marginal beads of the track they are effective to withstand axial expansion of the track only at the center of the latter.

The inflatable annulus B is disposed against the inside surface of the traction band A, serving as a cushion to space the traction band from the tires 4 and 5 and to retain the band A in predetermined position on the tires. The annulus B is formed of a pair of endless inflatable tubes 20 and 21 which are disposed in side by side relation and are reinforced by transverse or radial cords 22 extending in parallel relationship to the rotational axis of the device. These cords extend across the width of the inflatable tubes and may be provided in the form of two or more plies of cords embedded in sheeted rubber. This sheeted rubber, having reinforcing cords embedded therein, is wrapped or otherwise placed around the tubes 20 and 21 until the desired number of layers have been built up. The tubes 20 and 21 are relatively thin radially and are of sufficient width so that when placed side by side between the beads of the track A, the inner circumferential portions of the tubes are adjacent one another in confronting relation and the tube 20 overlies or embraces the road engaging tread of the tire 4 while the tube 21 overlies or embraces the road engaging tread of the tire 5.

The adjacent inner or confronting portions of the inflatable tubes are circumferentially connected together by rubber covered strips of reinforcing cord fabric. These reinforcing or connecting strips are arranged so that the strips of one series (indicated at 23) are connected to the inner side of the tube 21 and extend radially outward between the tubes and thence against the outer side of the tube 20, while the strips 24 of another series alternate with the strips 23 and extend from the inner side of the tube 20 radially outward between the tubes and thence over the outer side of the tube 21. Thus the connecting strips 23 and 24 are arranged in crossed relation to one another and constitute diagonal tension members that prevent rolling of the inflatable tubes on the tires when the traction device is subjected to axial thrusts. Desirably, filler strips 25 are placed in the angles between the connecting strips 23 and 24 and extend circumferentially about the inflatable annulus B. An outer covering or layer of rubber, indicated at 26, may be placed around the annulus B to seal the reinforcing cords 22 and to form a protective cover for the annulus.

The beads of the traction band A, even when relatively deep as shown in Figs. 1 through 4, are of a larger diameter than the extreme diameter of the tires 4 and 5 on which the device is to be mounted. Accordingly, the band A can be placed over the tires when the latter are fully inflated, if so desired. The inflatable annulus B with the tubes 20 and 21 substantially exhausted of air may be worked between the tires 4 and 5 and the traction band A after the latter is positioned about the tires, or if desired, the traction band A with the inflatable annulus B assembled therewith may be placed as a unit over the dual wheel tires 4 and 5. When the device is suitably positioned about the dual wheel with the inflatable annulus B centered between the beads of the traction band A, the tubes 20 and 21 are inflated through suitable valve means. For example, a valve 29 may be attached to the tube 21 to inflate such tube, while a conduit or bypass valve 30 may be positioned to connect the interior of the tube 20 with the interior of the tube 21, so that equalized pressures are maintained in the two tubes. By this arrangement air introduced through the valve 29 serves to inflate the tube 20 as well as the tube 21.

The inflatable annulus B is preferably molded or vulcanized to approximately the shape shown in Fig. 2, wherein it is relatively thin and wide, each of the tubes 20 and 21 having a radially thin central portion 31 and deeper circumferentially extending marginal portions, the latter being thickened by additional layers of rubber at 32 and 33. The deeper marginal portions of the tubes tend to fit down over the shoulders of the tires, thus facilitating mounting of the device on the dual wheel so that the radially inner surfaces of the inflatable annulus somewhat conform to the road engaging tread surfaces of the tires.

Continuous circumferential portions 34 of the tubes 20 and 21 of the inflatable annulus B are exposed between the traction band and the tires of the wheel. Flexing of the side portions 34 of the inflatable annulus allows relative radial movement of the traction band A with respect to the tires 4 and 5 when the band is subjected to severe or concentrated loads. The inflatable annulus B, formed of relatively thin material (there being but two plies of transverse or radial reinforcing cords) is adapted to withstand repeated deflection and radial deformation incident to such relative movement. Growth of the tubes 20 and 21 across their width is not objectionable so that a relatively small number of plies of radial or transverse cords is sufficient to reinforce the tubes. On the other hand, circumferential growth of the traction band A is objectionable, and therefore, a large number of plies of circumferential cords is extremely desirable. By means of the present invention the requirement for pronounced flexibility in the inflatable portion of the device is satisfied while the rigidity and circumferential strength required to prevent growth or distension of the traction band is retained. The provision of a traction band reinforced primarily by circumferential cords in combination with an inflatable annulus reinforced primarily by transverse or radial cords satisfies the requirement for flexibility in the inflatable part that deforms under concentrated loads while retaining circumferential strength to resist growth.

The use of separate inflatable tubes to individually embrace the tires of the dual wheel and to jointly support the single traction band with respect to such wheel not only prevents objectionable distension of the inflatable device into the space 6 between the tires 4 and 5 but also resists axial movement or shifting of the band A with respect to the tires. For example, an axial thrust on the band A tending to move the same to the left as viewed in Fig. 2, causes the connecting strips (see Fig. 5) to be placed under tension, thus resisting rolling of the tubes 20 and 21 off the tires 4 and 5. Similarly, an axial thrust tending to move the band A to the right as shown in Fig. 2 places the connecting strips 24 (see Fig. 5) under tension, resisting rolling movement of the tubes 20 and 21 to the right. This resistance to axial rolling of the inflatable tubes, provided by the diagonal connecting members or elements 23 and 24, eliminates the necessity for deep beads to engage the shoulders of the tire since the traction band A can be retained in place on the dual wheel by frictional forces created between the inflatable annulus and the traction band, while the friction between the inflatable annulus and the tires 4 and 5 prevents lateral shifting of the device on the dual wheel. Thus all axial thrusts are transmitted through the inflatable annulus B, there being no interlocking of the traction band A and the resilient tires 4 and 5 of the dual wheel.

The principles of the present invention may be utilized in various ways, numerous modifications and alterations being contemplated, substitution of parts and changes in construction being resorted to as desired, it being understood that the embodimens shown in the drawings and described above are given merely for purposes of explanation and illustration without intending to limit the scope of the claims to the specific details disclosed.

What I claim is:

1. A device of the character described for mounting on an inflatable tire of a vehicle wheel comprising a relatively wide and substantially flat endless band of resilient flexible material reinforced by a plurality of plies of cords superimposed one against another, said cords extending primarily circumferentially about the band, a plurality of traction cleats formed on the outer surface of the band, and ply material extending over areas of less width than the band and disposed between the circumferential cords and the cleats, said ply material having transverse cords and being continuous under a plurality of adjacent cleats to resist separation of the cleats, and the cords in the ply material being disposed angularly with respect to the circumferential cords.

2. A device of the character described for mounting on an inflatable tire of a vehicle wheel comprising a relatively wide and substantially flat endless band of resilient flexible material reinforced by a plurality of plies of cords superimposed one against another, said cords extending primarily circumferentially about the band, a plurality of traction cleats formed on the outer surface of the band, and circumferentially extending plies of bias cut cord material extending under the cleats between the latter and the circumferential cords, said bias cut plies being less in number than the plies of circumferential cords.

3. A traction device for mounting on resilient and deformable tire means of a vehicle wheel, comprising a relatively wide endless band of resilient flexible material reinforced by embedded cords extending primarily circumferentially around the band and a separate inflatable annulus for disposition against the inner side of the band to space the band from the vehicle tire means and to hold the band on the tire means, said inflatable annulus being reinforced by embedded cords extending primarily radially and across the width thereof.

4. A traction device for mounting on resilient and deformable tire means of a vehicle wheel, comprising a relatively wide endless band of resilient flexible material reinforced by embedded cords extending primarily circumferentially around the band and a separate inflatable annulus for disposition against the inner side of the band to space the band from the vehicle tire means and to hold the band on the tire means, said inflatable annulus being reinforced by embedded cords extending primarily radially and across the width thereof, and said band having radial bead flange means engageable with the annulus to center the band on the annulus.

5. A traction device for mounting on resilient and deformable tire means of a vehicle wheel, comprising a relatively wide endless band of resilient flexible material reinforced by embedded cords extending primarily circumferentially around the band and a separate inflatable annulus for disposition against the inner side of the band to space the band from the vehicle tire means and to hold the band on the tire means, said inflatable annulus being reinforced by embedded cords extending primarily radially and across the width thereof, and said band having integral bead flange means extending radially inwardly along its edges to overlie the sides of the annulus and thereby center the band on the annulus.

6. A traction device for mounting on resilient and deformable tire means of a vehicle wheel, comprising a relatively wide endless band of resilient flexible material reinforced by embedded cords extending primarily circumferentially around the band and a separate inflatable annulus for disposition against the inner side of the band to space the band from the vehicle tire means and to hold the band on the tire means, said inflatable annulus being reinforced by embedded cords extending primarily radially and across the width thereof, and the inner side of the band being recessed to receive the annulus, the depth of such recess being less than the radial thickness of the inflated annulus whereby the sides of the annulus are exposed throughout their circumferential extent when the device is mounted.

7. The combination with a vehicle wheel having two tires mounted side by side, with a space between the treads thereof, of a relatively wide endless band of resilient flexible material surrounding the tires and sufficiently wide simultaneously to overlie the major portions of the road engaging treads of both tires, and a separate inflatable annulus disposed against the inner side of the band to space the band from the tires and to hold the band on the tires, said annulus being sufficiently wide simultaneously to contact the road engaging treads of both tires, and having a portion adapted to be forced by inflation pressure into the space between the tire treads.

8. The combination with a vehicle wheel having two tires mounted side by side, with a space between the treads thereof, of a relatively wide endless band of resilient flexible material surrounding the tires and sufficiently wide simultaneously to overlie the major portions of the road engaging treads of both tires, and a separate inflatable annulus disposed against the inner side of the band to space the band from the tires and to hold the band on the tires, said annulus being sufficiently wide simultaneously to contact the road engaging treads of both tires, and having means connecting its interior and exterior walls intermediate the side edges thereof for resisting axial rolling of the annulus on the tires.

9. The combination with a vehicle wheel having two tires mounted side by side, with a space between the treads thereof, of a relatively wide endless band of resilient flexible material surrounding the tires and sufficiently wide simultaneously to overlie the major portions of the road engaging treads of both tires, and a pair of endless inflatable tubes disposed in side by side relation individually to embrace the tires of the wheel and received within the band to support the band on the tires, said tubes having portions adapted to be forced by inflation pressure into the space between the tire treads.

10. The combination with a vehicle wheel having two tires mounted side by side, with a space between the treads thereof, of a relatively wide endless band of resilient flexible material surrounding the tires and sufficiently wide simultaneously to overlie the major portions of the road engaging treads of both tires, and a pair of endless inflatable tubes disposed in side by side relation individually to embrace the tires of the wheel and received within the band to support the band on the tires, said endless tubes being connected together along their adjacent sides to resist rolling of the tubes on the tires.

11. The combination with a vehicle wheel having two tires mounted side by side, with a space between the treads thereof, of a relatively wide endless band of resilient flexible material surrounding the tires and sufficiently wide simultaneously to overlie the major portions of the road engaging treads of both tires, cords embedded in said band to reinforce the same and extending primarily circumferentially around the band, and a pair of endless inflatable tubes disposed in side by side relation and connected together along their adjacent sides to form a unitary inflatable annulus received within the band to support the latter on the tire.

12. The combination with a vehicle wheel having two tires mounted side by side, with a space between the treads thereof, of a relatively wide endless band of resilient flexible material surrounding the tires and sufficiently wide simultaneously to overlie the major portions of the road engaging treads of both tires, cords embedded in said band to reinforce the same and extending primarily circumferentially around the band, a pair of endless inflatable tubes disposed in side by side relation and connected together along their adjacent sides to form a unitary inflatable annulus received within the band to support the latter on the tire, and cords embedded in said annulus and extending primarily radially and across the width thereof to reinforce the annulus.

13. The combination with a vehicle wheel having two tires mounted side by side, with a space between the treads thereof, of a relatively wide endless band of resilient flexible material surrounding the tires and sufficiently wide simultaneously to overlie the major portions of the road engaging treads of both tires, a pair of endless inflatable tubes disposed in side by side relation and connected together along their adjacent sides to form a unitary inflatable annulus received within the band to support the latter on the tires, and cords embedded in the annulus and extending primarily radially and across the width thereof to reinforce the annulus.

14. For use with a traction device mountable on a vehicle wheel, an inflatable annulus comprising a plurality of endless tubes disposed in side by side relation and each reinforced by embedded cords extending primarily radially and across the width thereof, certain of said cords extending from one tube to another at the adjacent sides of the tubes to secure the tubes together and thereby resist rolling of the tubes.

15. A traction device for mounting upon a vehicle wheel periphery, comprising an endless band of resilient flexible material having inwardly projecting circumferential bead flanges at its opposite edges, and a separate inflatable annulus mounted within said band, between the bead flanges thereof, said annulus comprising a plurality of endless tubes arranged side by side and connected at their adjoining edges to resist rolling of the tubes.

16. A traction device for mounting upon a vehicle wheel periphery, comprising a relatively wide endless band of resilient flexible material reinforced by embedded cords extending primarily circumferentially around the band, said band having inwardly projecting circumferential bead flanges at its opposite edges, and a separate inflatable annulus mounted within said band between the bead flanges thereof, said annulus being adapted, upon inflation, to retain said band upon the wheel periphery and to space said band from the wheel periphery, said annulus being reinforced by embedded cords extending primarily radially and across the width thereof.

17. A traction device for mounting upon a vehicle wheel periphery, comprising an endless band of resilient flexible material having inwardly projecting circumferential bead flanges at its opposite edges, and a separate inflatable annulus mounted within said band between the bead flanges thereof, said annulus comprising a plurality of endless tubes arranged side by side, and each reinforced by embedded cords extending primarily radially, and across the width thereof, certain of said cords being disposed in crossing relation and extending from one tube to another at the adjacent sides of the tubes to secure the tubes together, and thereby resist rolling of the tubes.

18. A traction device for mounting upon a vehicle wheel periphery, comprising a transversely flat endless band of resilient flexible material having short inwardly projecting circumferential bead flanges at its opposite edges, and a separate inflatable cord reinforced annulus fitting within the band between the bead flanges thereof, said annulus having a transversely elongated air-receiving cavity and means connecting central portions of the interior and exterior walls of the annulus to resist rolling of the annulus.

HERMAN T. KRAFT.